(12) United States Patent
Kim et al.

(10) Patent No.: US 10,003,769 B2
(45) Date of Patent: Jun. 19, 2018

(54) VIDEO TELEPHONY SYSTEM, IMAGE DISPLAY APPARATUS, DRIVING METHOD OF IMAGE DISPLAY APPARATUS, METHOD FOR GENERATING REALISTIC IMAGE, AND NON-TRANSITORY COMPUTER READABLE RECORDING MEDIUM

(71) Applicant: SAMSUNG ELECTRONICS CO., LTD., Suwon-si (KR)

(72) Inventors: Eun-seo Kim, Gimpo-si (KR); Sang-yoon Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days. days.

(21) Appl. No.: 15/212,381

(22) Filed: Jul. 18, 2016

(65) Prior Publication Data

US 2017/0085834 A1    Mar. 23, 2017

(30) Foreign Application Priority Data

Sep. 23, 2015    (KR) ........................ 10-2015-0134714

(51) Int. Cl.
*H04N 7/14*    (2006.01)
*G06F 3/14*    (2006.01)
(Continued)

(52) U.S. Cl.
CPC ............. *H04N 7/147* (2013.01); *G06F 3/011* (2013.01); *G06F 3/048* (2013.01);
(Continued)

(58) Field of Classification Search
CPC ........ H04N 7/147; H04N 7/15; H04L 65/403; G06K 9/6267; G06F 3/048; G06F 3/14;
(Continued)

(56) References Cited

U.S. PATENT DOCUMENTS

2009/0033737 A1    2/2009    Goose et al.
2009/0051699 A1    2/2009    Posa et al.
(Continued)

FOREIGN PATENT DOCUMENTS

WO    2014/022170 A1    2/2014

OTHER PUBLICATIONS

Communication dated Feb. 13, 2017, issued by the European Patent Office in counterpart European Patent Application No. 16180160.0.
(Continued)

*Primary Examiner* — Stella Woo
(74) *Attorney, Agent, or Firm* — Sughrue Mion, PLLC

(57) ABSTRACT

A video telephony system includes a first image display apparatus and a second image display apparatus which makes a video call with the first image display apparatus. The first image display apparatus transmits a first image including a photographed image of a first user to the second image display apparatus, and receives a second image in which a background of a photographed image of a second user is substituted with a virtual background image, from the second image display apparatus. The second image display apparatus changes the virtual background image of the second image according to a change in a location of the first user and transmits the second image.

16 Claims, 16 Drawing Sheets

(51) Int. Cl.
| | |
|---|---|
| *G06F 3/01* | (2006.01) |
| *H04N 7/15* | (2006.01) |
| *G06K 9/62* | (2006.01) |
| *G06T 7/00* | (2017.01) |
| *G06F 3/048* | (2013.01) |
| *H04L 29/06* | (2006.01) |
| *G06F 3/0481* | (2013.01) |
| *H04L 12/18* | (2006.01) |
| *H04M 1/725* | (2006.01) |
| *H04N 13/00* | (2018.01) |
| *G06T 7/194* | (2017.01) |
| *G09G 3/00* | (2006.01) |

(52) U.S. Cl.
CPC ............ *G06F 3/04815* (2013.01); *G06F 3/14* (2013.01); *G06K 9/6267* (2013.01); *G06T 7/0081* (2013.01); *G06T 7/194* (2017.01); *H04L 12/1813* (2013.01); *H04L 65/403* (2013.01); *H04M 1/725* (2013.01); *H04N 7/141* (2013.01); *H04N 7/15* (2013.01); *H04N 7/157* (2013.01); *H04N 13/0022* (2013.01); *G06T 2207/10028* (2013.01); *G06T 2207/20144* (2013.01); *G09G 3/003* (2013.01); *H04N 2007/145* (2013.01)

(58) Field of Classification Search
CPC ................... G06F 3/011; G06T 7/0081; G06T 2207/20144; G06T 2207/10028
See application file for complete search history.

(56) References Cited

U.S. PATENT DOCUMENTS

| | | | |
|---|---|---|---|
| 2010/0014781 A1* | 1/2010 | Liu | H04N 13/0022 382/285 |
| 2010/0067782 A1* | 3/2010 | Dunn | G06T 7/0081 382/162 |
| 2012/0038742 A1 | 2/2012 | Robinson et al. | |
| 2012/0050323 A1* | 3/2012 | Baron, Jr. | H04N 7/15 345/632 |
| 2014/0139609 A1* | 5/2014 | Lu | H04N 7/15 348/14.03 |
| 2014/0232816 A1 | 8/2014 | Wilson et al. | |
| 2014/0362163 A1* | 12/2014 | Winterstein | H04N 7/15 348/14.07 |
| 2015/0080016 A1* | 3/2015 | Smith | H04L 65/1006 455/456.1 |
| 2015/0380051 A1* | 12/2015 | Segal | G11B 27/031 386/282 |

OTHER PUBLICATIONS

Harrison et al; "Pseudo-3D Video Conferencing with a Generic Webcam"; Tenth IEEE International Symposium on Multimedia; Dec. 15, 2008; XP031403542; pp. 236-241; 6 pgs. total.

* cited by examiner

530

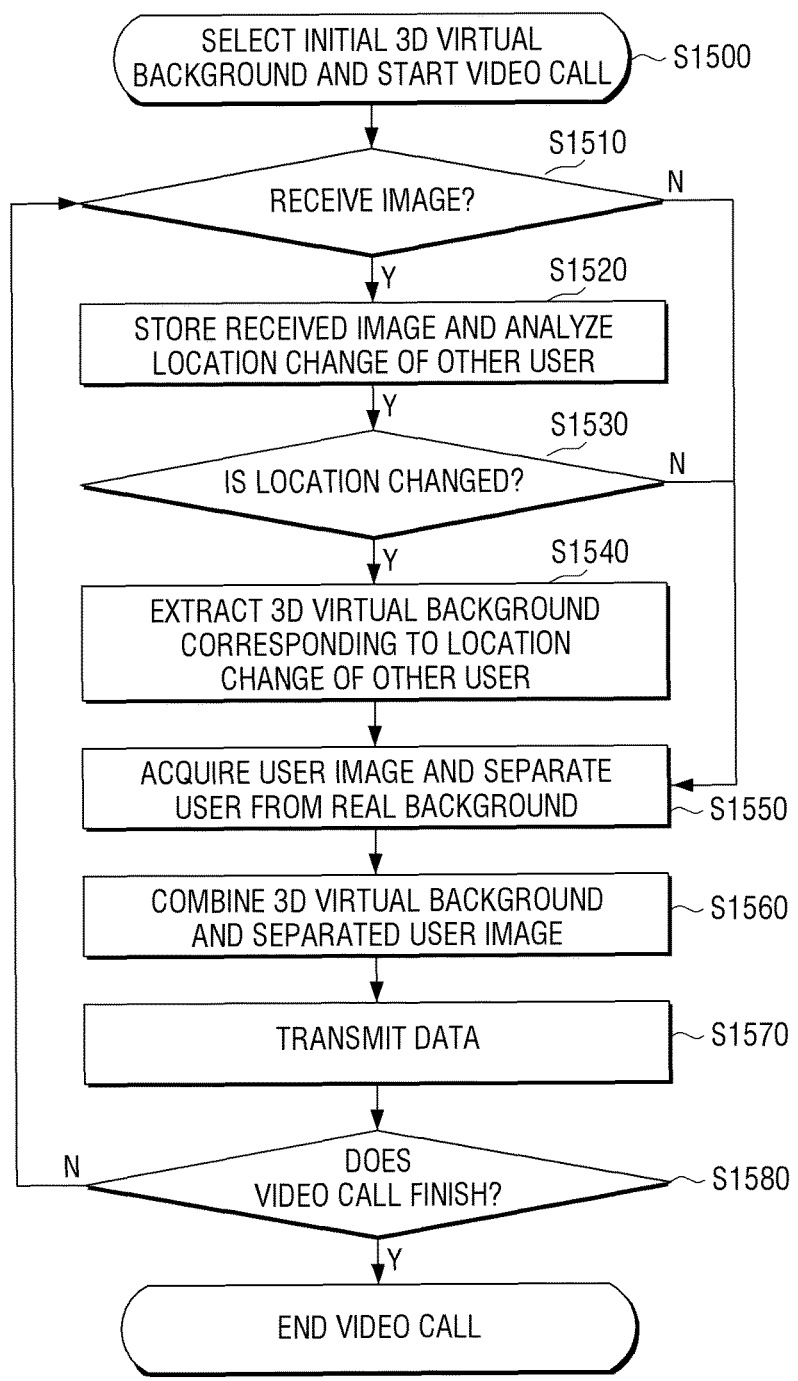

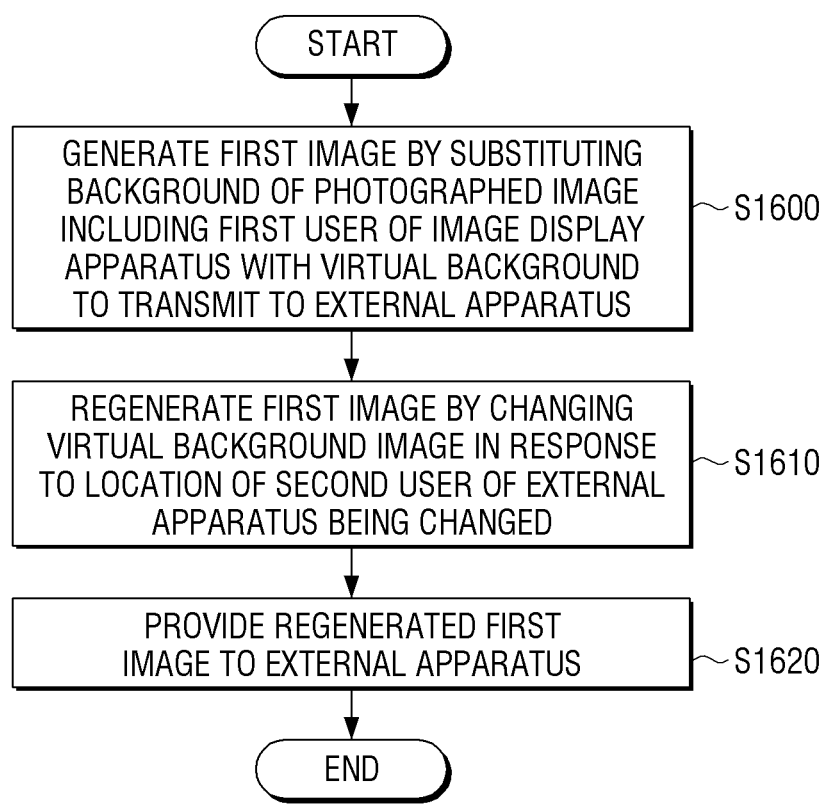

VIDEO TELEPHONY SYSTEM, IMAGE DISPLAY APPARATUS, DRIVING METHOD OF IMAGE DISPLAY APPARATUS, METHOD FOR GENERATING REALISTIC IMAGE, AND NON-TRANSITORY COMPUTER READABLE RECORDING MEDIUM

CROSS-REFERENCE TO RELATED APPLICATION

This application claims priority from Korean Patent Application No. 10-2015-0134714, filed on Sep. 23, 2015 in the Korean Intellectual Property Office, the disclosure of which is incorporated herein by reference in its entirety.

BACKGROUND

1. Field

Apparatuses and methods consistent with exemplary embodiments relate to a video telephony system, an image display apparatus, a driving method of an image display apparatus, a method for generating a realistic image, and a non-transitory computer readable recording medium, and more particularly, to a video telephony system, an image display apparatus, a driving method of an image display apparatus, a method for generating a realistic image, and a non-transitory computer readable recording medium, which can protect privacy when a video call is made using an image display apparatus located at a fixed location, and also can provide a realistic video call when a user's location is changed.

2. Description of the Related Art

Various methods have been used for protecting privacy during a video call. These methods are related to extracting a user's appearance, combining it with a virtual background, and showing the image to the other user. To extract a user image, the related art method may be a method which separates the user and the background based on color information of a single color background through a related art two-dimensional (2D) camera, or through a differential image and a previous frame by learning the background in advance.

In addition, as a three-dimensional (3D) depth camera has been introduced in recent years, the background can be easily separated by extracting depth information, and thus a user image separated from the background is combined with a virtual image and shown in virtual reality, games, and video call.

In the case of a video call, a user may be reluctant to expose the inside of a house or a current place where a call is made, there is an increasing demand for a method of substituting a background of a caller with a virtual image for the purpose of protecting privacy and security. In addition, as the size and resolution of displays increases, there is a demand for a method of increasing a sense of reality to make users feel as if they really talk with each other face to face.

The related art method of extracting a user image through a 2D camera needs to use color information using a single color background or require a step of learning the background without a user in advance to model the background. However, when the single color background is used, a color value may be changed according to an illumination condition, and in this case, there is a problem that a user's appearance including a background is extracted. In addition, when the background is learned in advance, the background which is changed according to a user's location needs to be learned every time the background is changed.

On the other hand, the method of using 3D camera depth information can separate a user and a background, but there is a problem that the contour of the user is not clearly separated.

In addition, when the separated image of the other user and the virtual image are combined and displayed, the background of the other user is fixed even if the user moves, and thus it is difficult for the users to feel as if they talk with each other face to face.

SUMMARY

One or more exemplary embodiments may overcome the above disadvantages and other disadvantages not described above. However, an exemplary embodiment is not required to overcome the disadvantages described above, and may not overcome any of the problems described above.

One or more exemplary embodiments provide a video telephony system, an image display apparatus, a driving method of an image display apparatus, a method for generating a realistic image, and a computer readable recording medium, which can protect privacy when a video call is made using an image display apparatus located at a fixed location, and also can provide a realistic video call when a user's location is changed.

According to an aspect of an exemplary embodiment, there is provided a video telephony system using an image display apparatus, the video telephony system including: a first image display apparatus and a second image display apparatus which makes a video call with the first image display apparatus, wherein the first image display apparatus transmits a first image including a photographed image of a first user to the second image display apparatus, and receives a second image in which a background of a photographed image of a second user is substituted with a virtual background image from the second image display apparatus, and the second image display apparatus changes the virtual background image of the second image according to a change in a location of the first user and transmits the second image.

According to an aspect of another exemplary embodiment, there is provided an image display apparatus which performs a video call with an external apparatus, the image display apparatus including: a communication interface configured to receive a first image which is generated by photographing a first user of the external apparatus, and transmit, to the external apparatus, a second image in which a background of a photographed image of a second user is substituted with a virtual background image; a display configured to display the received first image; and a controller configured to change the virtual background image of the second image according to a change in a location of the first user.

The image display apparatus may further include a storage configured to store a plurality of virtual background images, and, in response to there being a user command to perform a video call, the controller may be configured to transmit, to the external apparatus, the second image which is generated by substituting the background of the photographed image of the second user with one of the stored plurality of virtual background images.

to display the second image which has the changed virtual background image on the external apparatus, the controller may be configured to analyze the received first image and determine whether the location of the first user is changed or not, and in response to there being a change in the location, the controller may be configured to change the virtual background image of the second image and transmit the second image to the external apparatus.

The storage may be configured to classify the plurality of virtual background images by depth, and store the plurality of virtual background images, and the controller may be configured to select a virtual background image of depth corresponding to the change in the location from among the plurality of virtual background images, and generate the second image based on the virtual background image, and transmit the second image to the external apparatus.

The image display apparatus may further include an image sensor configured to photograph the second user, and the controller may be configured to separate an image of the second user from the photographed image, and combine the separated image of the second user with one of the plurality of virtual background images.

The image display apparatus may further include a user interface configured to receive a user command to make a video call, and, in response to the user command being received, the controller may be configured to generate the second image which has the background substituted with the virtual background image, and transmit the second image to the external apparatus.

According to an aspect of another exemplary embodiment, there is provided a driving method of an image display apparatus which performs a video call with an external apparatus, the driving method including: receiving a first image which is generated by photographing a first user of the external apparatus; displaying the received first image on a screen; transmitting, to the external apparatus, a second image in which a background of a photographed image of a second user is substituted with a virtual background image; and changing the virtual background image of the second image according to a change in a location of the first user, and transmitting the second image to the external apparatus.

The driving method may further include: storing a plurality of virtual background images; generating the second image by substituting the background of the photographed image of the second user with one of the stored plurality of virtual background images; and transmitting the generated second image to the external apparatus.

The driving method may further include, to display the second image which has the changed virtual background image on the external apparatus, analyzing the received first image and determining whether the location of the first user is changed or not, and the generating the second image may include, in response to there being a change in the location, changing the virtual background image of the second image.

The storing may include classifying the plurality of virtual background images by depth, and storing the plurality of virtual background images, and the generating the second image may include selecting a virtual background image of depth corresponding to the change in the location from among the plurality of virtual background images, and generating the second image.

The driving method may further include: photographing the second user; and separating an image of the second user from the photographed image, and the generating the second image may include generating the second image by combining the separated image of the second user with one of the plurality of virtual background images.

The driving method may further include receiving a user command to make a video call, and the generating the second image may include, in response to the user command being received, generating the second image which has the background substituted with the virtual background image.

According to an aspect of another exemplary embodiment, there is provided a method for generating a realistic image of an image display apparatus, the method including: generating a first image by substituting a background of a photographed image of a first user of the image display apparatus with a virtual background image to transmit to an external apparatus; in response to there being a change in a location of a second user of the external apparatus, regenerating the first image by changing the virtual background image according to the change in the location; and providing the regenerated first image to the external apparatus.

The method may further include: receiving a second image which is generated by substituting a background of a photographed image of the second user with a virtual background image; in response to there being a change in a location of the first user, receiving the second image which has the virtual background image changed according to the change in the location of the first user; and providing the received second image to a display.

The method may further include: photographing the second user; separating an image of the second user from the photographed image; and combining the separated image of the first user and a virtual background image.

The combining with the virtual background image may include: analyzing the received second image according to the change in the location of the second user and determining whether the location of the second user is changed or not; and in response to there being a change in the location, generating the first image by selecting a virtual background image corresponding to the change in the location from among the stored plurality of virtual background images.

According to an aspect of another exemplary embodiment, there is provided a non-transitory computer readable recording medium which includes a program for executing a method for generating a realistic image of an image display apparatus, the method including: generating a first image by substituting a background of a photographed image of a first user of the image display apparatus with a virtual background image to transmit to an external apparatus; in response to there being a change in a location of a second user of the external apparatus, regenerating the first image by changing the virtual background image according to the change in the location; and providing the regenerated first image to the external apparatus.

BRIEF DESCRIPTION OF THE DRAWING FIGURES

The above and/or other aspects will become more apparent by describing certain exemplary embodiments with reference to the accompanying drawings, in which:

FIG. 15 is a flowchart showing a driving process of an image display apparatus according to another exemplary embodiment; and FIG. 16 is a flowchart showing a realistic image generation process of an image display apparatus according to an exemplary embodiment.

DETAILED DESCRIPTION OF EXEMPLARY EMBODIMENTS

Figure 1:
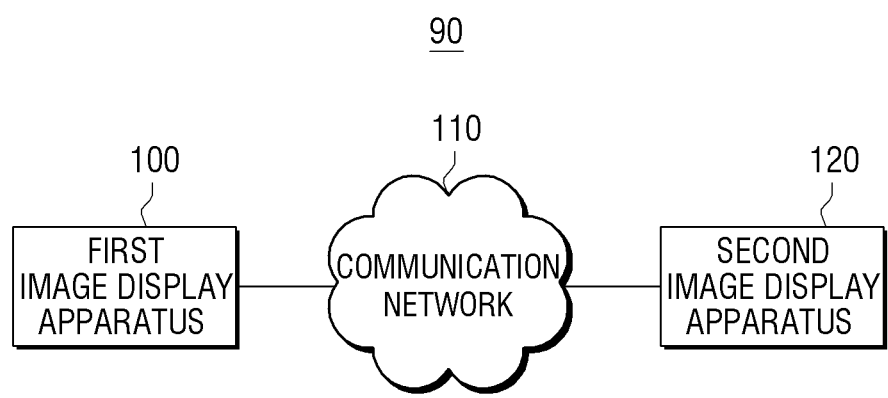
FIG. 1 is a view showing a video telephony system according to an exemplary embodiment.

Certain exemplary embodiments will be described in greater detail with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

FIG. 1 is a view showing a video telephony system according to an exemplary embodiment.

As shown in FIG. 1, the video telephony system 90 according to the exemplary embodiment include a part or entirety of a first image display apparatus 100, a communication network 110, and a second image display apparatus 120.

Herein, the expression "including a part or entirety" may mean that the video telephony system 90 is configured without some elements such as the communication network 110. For example, the two image display apparatuses 100 and 120 may perform direct communication such as P2P. Accordingly, in the following description, the video telephony system 90 includes the entirety of the elements for convenience of explanation.

First, the first image display apparatus 100 is an apparatus which is fixed at a specific location like a digital television (DTV) or a computer and is able to perform a video call. Of course, portable image display apparatuses such as mobile phones, laptop computers, tablet PCs, etc. may be included in the range of the first image display apparatus 100 according to an exemplary embodiment as long as they are fixed at a specific location and are used. In other words, it is preferable that the first image display apparatus 100 is located at a fixed location, and this makes it easy for the first image display apparatus 100 to determine whether a user's location is changed or not and generate a virtual background image in response to the change of the location.

More specifically, the first image display apparatus 100 may include a 3D camera. The first image display apparatus 100 photographs a user (hereinafter, referred to as a user 1) who is viewing an image near the first image display apparatus 100 through the 3D camera. By doing so, a photographed image including the user 1 and a surrounding environment of the user 1, that is, a real background, is generated. In this case, the first image display apparatus 100 may acquire depth information which is generated by the 3D camera. Herein, the depth information may be information indicating the depth of each object or pixel, that is, perspective, in the photographed image. The user may separate the image of the user 1 and the background from the photographed image based on the depth information. In addition, the first image display apparatus 100 generates a first image by combining the image of the user 1 and a pre-stored virtual background image, and transmits the first image to the second image display apparatus 120 via the communication network 110.

To generate the first image as described above, the first image display apparatus 100 pre-stores virtual background images of various depths to be applied according to a change in the left and right location or a change in the front and rear location of the user 1. That is, the first image display apparatus 100 may pre-store 3D virtual background images. In addition, when the first image display apparatus 100 generates the first image at the beginning of the video call, the first image display apparatus 100 generates the first image by selecting a virtual background image which is set in a predetermined method, that is, as default. Herein, the virtual background image selected as default may be a virtual background image which is located at the center from among the plurality of virtual background images. This may be set by a system designer in various ways.

The first image display apparatus 100 may receive a second image generated in the second image display apparatus 120 and display the second image on the screen due to the characteristic of the video call. The second image is also generated in the same way as the first image. According to an exemplary embodiment, the first image display apparatus 100 may view the changed second image based on two situations. Herein, the changed second image may refer to the second image which has the location of a user 2 changed, and more exactly, to the second image which has its virtual background image changed. In addition, the user 2 may be a user who joins in the video call near the second image display apparatus 120. The first image display apparatus 100, that is, the user 1, is at the fixed location, but may view the changed second image in response to the user having his/her location changed. In other words, the second image display apparatus 120 combines (or synthesizes) the image of the user 2 having the changed location and a corresponding virtual background image, and transmits the combined image to the first image display apparatus 100. In addition, the first image display apparatus 100 may view the changed second view even when the user 1 changes his/her location and the user 2 fixes his/her location. Accordingly, the user 1 may feel that the user 1 performs a realistic video call changing according to a change in his/her location.

In the latter case, the first image display apparatus 100 may combine the image of the user 1 having the changed location and a corresponding virtual background image in the same way as when the user 2 of the second image display apparatus 120 changes his/her location, and transmit the combined image to the second image display apparatus 120. In this case, the second image display apparatus 120 may analyze the previously received first image and the changed first image and determine whether the location of the user 1 is changed or not. In response to it being determined that the location is changed, the second image display apparatus 120 may combine the image of the user 2 and a virtual background image reflecting corresponding depth, and transmit the combined image to the first image display apparatus 100. The first image display apparatus 100 simply processes the received second image and displays the second image on the screen, but, since the second image having the changed virtual background image is transmitted from the second image display apparatus 120, the user 1 feels that the virtual background image is changed according to the change of the location of the user 1.

The first image display apparatus 100 may analyze the first image which is generated by itself and may inform whether the location of the user 1 is changed or not. In this case, the second image display apparatus 120 may receive information on whether the location is changed or not and information on how much the location is changed, that is, depth information. Then, the second image display apparatus 120 may select a virtual background image based on the received depth information, and generate the second image by combining the image of the user 2 and the selected virtual background image in the photographed image. Accordingly, exemplary embodiments are not limited by which of the image display apparatuses analyzes the image.

The communication network 110 includes all wired/wireless communication networks. Herein, the wired network may include a cable network or Internet such as a PSTN, and the wireless communication network may include a Code Division Multiple Access (CDMA), a wideband CDMA (WCDAM), Global System for Mobile Communications (GSM), Evolved Packet Core (EPC), Long Term Evolution (LTE), a Wibro, etc. Accordingly, when the communication network 110 is a wired communication network, an access point can access an exchange office of a telephone company, but, when the communication network 110 is a wireless communication network, the access point may access an SGSN or Gateway GPRS Support Node (GGSN) which is run by a mobile network operator to process data, or may access various repeaters such as base station transmission (BTS), NodeB, e-NodeB to process data.

In addition, the communication network 110 may include a small base station (AP) installed in a building, such as a femto base station or a pico base station. Herein, the small base station may be classified into the femto base station or the pico base station according to the maximum number of mobile devices which can access the small base station. The AP may include a short-distance communication module for performing short-distance communication such as Zigbee, WiFi, etc. with the mobile device, e.g., at least one among the first image display apparatus 100 and second image display apparatus 120. According to an exemplary embodiment, the short-distance communication may be performed according to various standards such as Bluetooth, Zigbee, Infrared Data Association (IrDA), Radio Frequency (RF) such as Ultra High Frequency (UHF) and Very High Frequency (VHF), Ultra Wideband (UWB), in addition to WiFi.

The second image display apparatus 120 transmits, to the first image display apparatus 100, the second image which is generated by changing the background of the photographed image of the user 2 to a virtual background image. In addition, in response to there being a change in the location of the user 2, the second image display apparatus 120 may combine the image of the user 2 according to the changed location and the virtual background image corresponding to the changed location, and transmit the combined image to the first image display apparatus 100. Furthermore, to determine whether the location of the user 1 is changed or not, the second image display apparatus 120 may analyze the received first image and determine whether the location of the user 1 is changed or not. As described above, the second image display apparatus 120 may receive only the depth information on the changed location. In response to it being determined that the location is changed, the second image display apparatus 120 combines the virtual background image corresponding to the changed location and transmits the combined image to the first image display apparatus 100. To combine the virtual background image according to the changed location as described above, the second image display apparatus 120 may also pre-store 3D virtual background images which are classified by various depths, and use the same. For example, it is assumed that the result of analyzing the first image indicates that the location of the user 1 is nearer or farther. This can be determined by comparing the images of the user 1. When the location of the user 1 is farther, a distance (d) is calculated according to the changed location and the calculated distance (d) is used when a new virtual background image is selected. In other words, a virtual background image reflecting the corresponding distance (d) is searched from the virtual background images stored in a database (DB) and used.

The other operations of the second image display apparatus 120 are not substantially different from the operations of the first image display apparatus 100, and thus a detailed description thereof is replaced with the above-described explanation and a redundant explanation is omitted.

As described above, a user's appearance is combined with a virtual background, and a parallax effect is applied to the background of the image of the other user according to the location of the user, so that the users can enjoy the realistic video call.

In addition, a privacy protection function which can hide the inside of a house that the user dislikes exposing, or information on a current user's location is available, and a parallax effect in which a point of view of a background to be seen is changed according to a user location is applied by substituting the background of an image to be transmitted to the other user during a video call with a virtual background image having depth information, so that a sense of reality is enhanced and thus the users can feel as if they really face each other.

Figure 2:
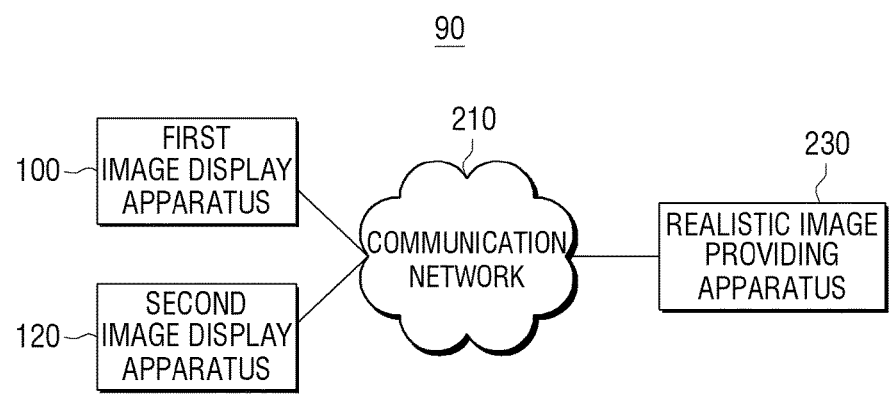
FIG. 2 is a view showing a video telephony system according to an exemplary embodiment.

FIG. 2 is a view showing a video telephony system according to an exemplary embodiment.

As shown in FIG. 2, the video telephony system 90 according to the exemplary embodiment is a system to which a cloud concept is applied, and includes a part or entirety of a first image display apparatus 100, a communication network 210, a second image display apparatus 120, and a realistic image providing apparatus 230. The expression "including a part or entirety" has the same meaning as described above.

Compared with the video telephony system 90 shown in FIG. 1, the video telephony system 90 shown in FIG. 2 differs from the video telephone system 90 in that realistic images generated in the first image display apparatus 100 and the second image display apparatus 120 of FIG. 1, that is, the first image and the second image, are generated in the realistic image providing apparatus 230 in FIG. 2.

More specifically, the first image display apparatus 100 and the second image display apparatus 120 provide images which are photographed by the 3D camera to the realistic image providing apparatus 230. Then, the realistic image providing apparatus 230 separates the user 1 or user 2 from the photographed images, determines a virtual background image set as default at the beginning of the video call, and generates a first image and a second image. Since the user can select the virtual background image at the beginning of the video call, the present invention is not limited to the above-described default setting. In addition, the generated first image is transmitted to the second image display apparatus 120 and the generated second image is transmitted to the second image display apparatus 120 via the communication network 210.

In the above-described process, the realistic image providing apparatus 230 may determine whether the location of the user 1 or user 2 is changed or not. In other words, the realistic image providing apparatus 230 may apply an appropriate virtual background image according to two situations described above, and transmit the images to the first and second image display apparatuses 100, 120.

Accordingly, the user 1 or user 2 can enjoy the realistic video call.

Except for the above-described feature, the first image display apparatus 100, the communication network 210, and the image display apparatus 220 of FIG. 2 are not substantially different from the first image display apparatus 100, the communication network 110, and the second image display apparatus 120 of FIG. 1, and thus a detailed explanation thereof is replaced with the above-described explanation.

In the above-described exemplary embodiment, the realistic image providing apparatus 230 involves only the generation of the realistic image for convenience of explanation. However, the realistic image providing apparatus 230 may serve as a cloud server. In other words, the first image display apparatus 100 and the second image display apparatus 120 may be provided with minimum hardware resources, and the realistic image providing apparatus 230 may process all images. Accordingly, the exemplary embodiments are not limited to the above-described features.

Figure 3:
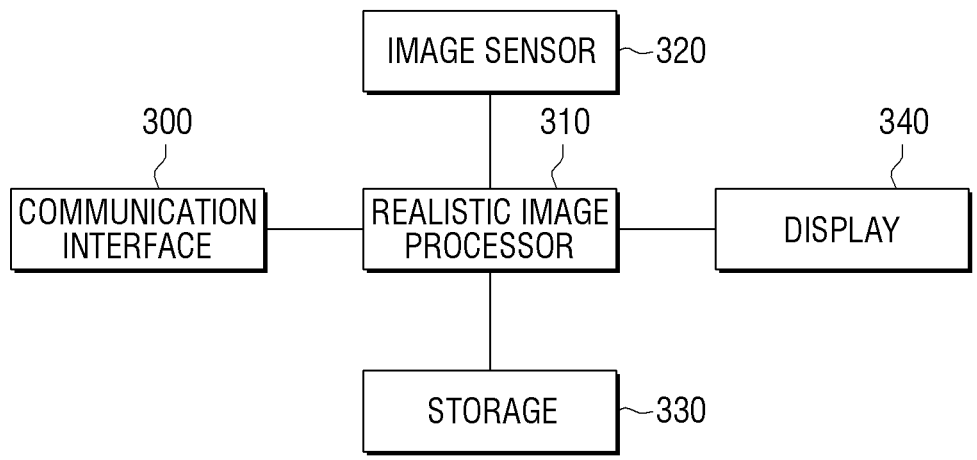
FIG. 3 is a block diagram showing a detailed configuration of an image display apparatus of FIG. 1.

FIG. 3 is a block diagram showing a detailed configuration of the image display apparatus of FIG. 1.

As shown in FIG. 3, each of the first image display apparatus 100 and the second image display apparatus 120 (hereinafter, the first image display apparatus will be explained) according to the exemplary embodiment may include a part or entirety of a communication interface 300, a realistic image processor 310, an image sensor 320, e.g., a camera, a storage 330, e.g., a memory, and a display 340, and may further include a sound outputter, e.g., a sound output device or transmitter, etc.

Herein, the expression "including a part or entirety" may mean that the first image display apparatus 100 is configured without some elements such as the image sensor 320 or some elements such as the storage 330 are integrated into other elements such as the realistic image processor 310, and, in the following description, the image display apparatus includes the entirety of the elements for the sake of easy understanding of the present disclosure.

The communication interface 300 may include a wired/wireless communication module to communicate with the communication network 110 of FIG. 1. Descriptions of various modules for receiving and processing a broadcast program will be omitted since they would obscure the subject matters of the invention, and a video telephony according to an exemplary embodiment will be mainly explained. The communication interface 300 may transmit a first image which is generated in the realistic image processor 310 to the second image display apparatus 120. In addition, in response to the location of the user 1 being changed, the communication interface 300 may transmit a first image which is regenerated in response to the change to the second image display apparatus 120.

In addition, the communication interface 300 may receive, from the second image display apparatus 120, a second image which is generated by substituting a background in the photographed image of the user 2 with a virtual background image, and deliver the second image to the realistic image processor 310. Furthermore, the communication interface 300 may receive the second image which is changed in response to a change in the location of the user 2.

The realistic image processor 310 may be configured by hardware or software only or a combination of them. In other words, some modules of software may be configured by hardware and thus the present disclosure does not limit the realistic image processor 310 according to whether the realistic image processor 310 is configured by hardware or software. For example, a registry of software may perform the same storing function as a memory of hardware.

The realistic image processor 310 may perform a control function and a function of generating and processing a realistic image. In other words, the realistic image processor 310 controls the overall operations of the communication interface 300, the image sensor 320, the storage 330, and the display 340 included in the first image display apparatus 100. For example, in response to the second image being provided from the communication interface 300, the realistic image processor 310 may store the second image in the storage 330 and then display the second image on the display 340. In addition, in response to a photographed image and depth information being provided from the image sensor 320, the realistic image processor 310 may temporarily store the image and the depth information in the storage 330 and then separate the image of the user 1 and the real background image from the photographed image based on the depth information. In addition, the realistic image processor 310 may select a virtual background image pre-stored in the storage 330 and combine the image of the user 1 and the virtual background image, and then provide the combined image to the communication interface 300 to transmit to the second image display apparatus 120.

For example, the realistic image processor 310 acquires the photographed image of the user and the depth information from the image sensor 320. Then, the realistic image processor 310 may analyze the depth information and the photographed image (or a color image) and separate the user's appearance, that is, the image of the user 1, and the background by applying user segment and matting techniques.

In addition, the realistic image processor 310 may analyze the second image stored in the storage 330 and determine whether the location of the user 2 is changed or not. The second image stored in the storage 330 may be a 2D image. In response to it being determined that the location is changed, the realistic image processor 310 may select a virtual background image reflecting depth corresponding to the changed location, and regenerate the first image by combining the virtual background image with the image of the user 1, and then deliver the first image to the communication interface 300 to transmit to the second image display apparatus 120.

The realistic image processor 310 may compare and analyze a previous 2D image stored in the storage 330 and a currently received 2D image to determine whether the location of the user 2 is changed or not. For example, the realistic image processor 310 may track location information of the other user using face detection, face tracking, eye (or eyeball) detection, and eye tracking techniques, and determine a change in the location based on the result of tracking.

More specifically, the realistic image processor 310 may track the location of the user 2 in real time by extracting a face, location of eyes, or body skeleton information of the other user, that is, the user 2, using the received second image. In addition, the realistic image processor 310 may extract a virtual background image to be transmitted according to a change in the location of the user 2. For example, in response to the location of the user 2 having changed from the left to the right, the background changes from the right to the left. In response to the location of the user 2 being close to the camera or far from the camera, the background is zoomed in or zoomed out. In this case, the user's location is not changed and thus only the background is zoomed in or zoomed out. Accordingly, the realistic image processor 310 generates the first image by combining the separated image of the user 2 and the virtual background image acquired in the above-described method, and transmits the first image to the second image display apparatus 120.

To perform the above-described operation, that is, the operation of generating the realistic image, the realistic image processor 310 may execute a program stored therein. However, the exemplary embodiment is not limited to executing the program.

The image sensor 320 may include a 3D camera. In other words, according to an exemplary embodiment, the image sensor 320 may use a 3D camera for generating depth information in order to easily separate a user image and a background image from a photographed image. However, since a related art 2D camera is able to detect and separate a user, the image sensor 320 may include a 2D camera. When the image sensor 320 is the 3D camera to generate or acquire depth information, the image sensor 320 may use all methods for acquiring depth information such as stereoscopic, Time of Fight (ToF), structured light. Accordingly, the image sensor 320 may include a module for executing this operation.

The storage 330 may store a virtual background image (or an image) or a moving image including 3D depth information previously created. The user may select a virtual background image to be used at the beginning of a voice call, and accordingly, the storage 330 may output the virtual background image. Even in response to the user not selecting the background, a 3D virtual background image which is set as default may be provided from the storage 330 under the control of the realistic image processor 310.

In addition, the storage 330 may store various data which is processed in the realistic image processor 310. For example, the storage 330 may store the second image which is the photographed image of the user 2. In response to a request from the realistic image processor 310, the storage 330 may output the pre-stored second image. As a result, the realistic image processor 310 may compare and analyze the currently received second image and the previously received and stored second image. In this way, the storage 330 may update the stored second image under the control of the realistic image processor 310.

The display 340 displays the received second image under the control of the realistic image processor 310. The second image is an image in which the appearance of the user 2 and the virtual background image are combined. In response to the location of the user 2 having changed, the display 340 may display the second image which has the appearance of the user 2 changed. On the other hand, in response to the location of the user 1 having changed, the display 340 may change the virtual background image to reflect depth, and display the changed second image.

Figure 4:
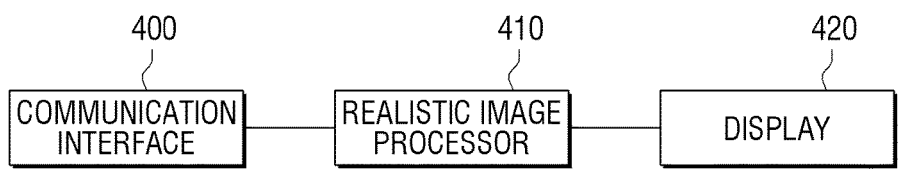
FIG. 4 is a view showing an example of a configuration of a realistic image processor of FIG. 3.

FIG. 4 is a block diagram showing an example of another detailed configuration of the image display apparatus of FIG. 1.

As shown in FIG. 4, the first image display apparatus 100 and the second image display apparatus 120 (hereinafter, the first image display apparatus 100 will be explained) according to another exemplary embodiment may include a part or entirety of a communication interface 400, a realistic image processor 410, and a display 420. Herein, the expression "including a part or entirety" has the same meaning as described above. In addition, the realistic image processor 410 may include the same configuration as a controller 530 and a realistic image generator 550 of FIG. 5.

Compared with the first image display apparatus 100 shown in FIG. 1, the first image display apparatus 100 of FIG. 4 differs therefrom in that the first image display apparatus 100 omits the image sensor 320 and the storage 330 of FIG. 3. For example, the image sensor 320 of FIG. 3 is not included in the first image display apparatus 100. That is, when the image sensor 320 is an individual device which stands alone, the image sensor 320 may be used simply by being connected to the communication interface 300. In addition, the storage 330 may be provided in the realistic image processor 310 in the form of a memory.

Except for the above-described features, the communication interface 400, the realistic image processor 410, and the display 420 included in the first image display apparatus 100 according to another exemplary embodiment are not substantially different from the communication interface 300, the realistic image processor 310, and the display 340 of FIG. 3, and thus a detailed explanation thereof is replaced with the above-described explanation.

Figure 5:
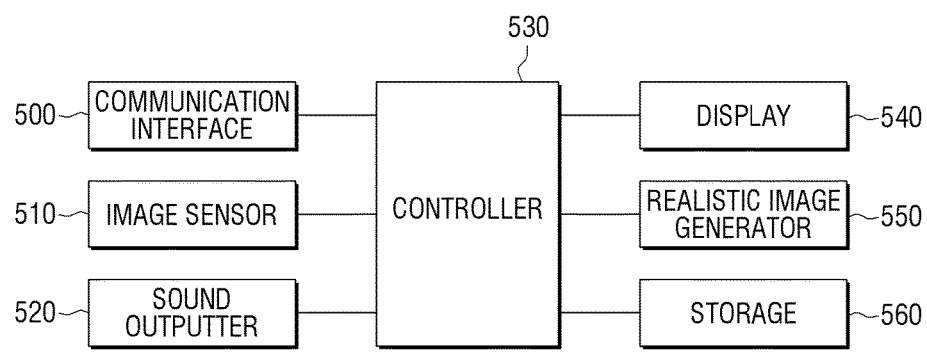
FIG. 5 is a block diagram showing an example of another detailed configuration of the image display apparatus of FIG. 1.
Figure 6:
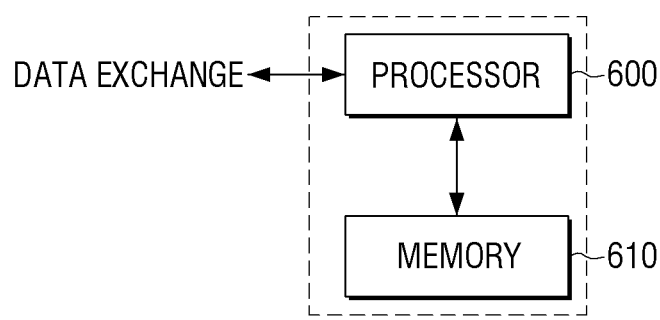
FIG. 6 is a block diagram showing an example of another detailed configuration of the image display apparatus of FIG. 1.
Figure 7:
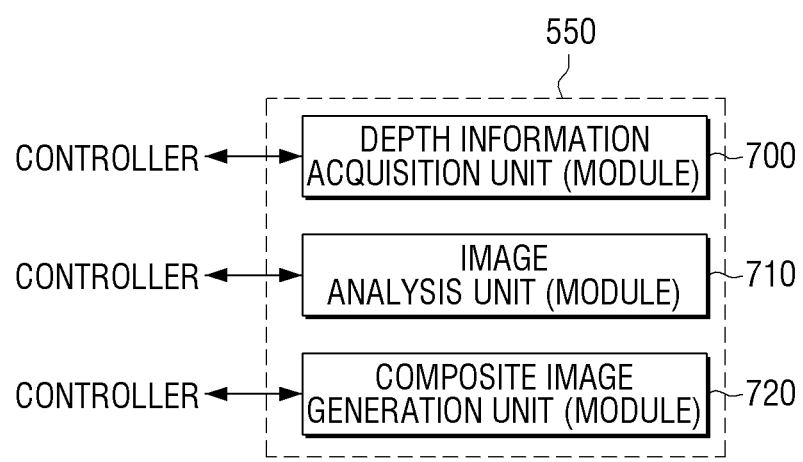
FIG. 7 is a view showing an example of a configuration of a realistic image generator of FIG. 6.

FIG. 5 is a block diagram showing an example of another detailed configuration of the image display apparatus of FIG. 1, FIG. 6 is a view showing an example of a configuration of the controller of FIG. 5, and FIG. 7 is a view showing an example of a configuration of the realistic image generator of FIG. 5.

As shown in FIG. 5, the first image display apparatus 100 or the second image display apparatus 120 (hereinafter, the first image display apparatus 100 will be explained) according to another exemplary embodiment may include a part or entirety of a communication interface 500, an image sensor 510, a sound outputter 520, a controller 530, a display 540, a realistic image generator 550, and a storage 560.

Herein, the expression "including a part or entirety" may mean that the first image display apparatus 100 is configured without some elements such as the image sensor 510 and the sound outputter 520, or some elements such as the realistic image generator 550 are integrated into the controller 530, and in the following description, the image display apparatus includes the entirety of the elements for the sake of easy understanding of the present disclosure.

Compared with the first image display apparatus 100 of FIG. 3, the first image display apparatus 100 of FIG. 5 differs therefrom in that the first image display apparatus 100 is divided into the controller 530 to perform a control function and the realistic image generator 550 to generate a realistic image.

Accordingly, the controller 530 may be regarded as serving to receive an image generated in the realistic image generator 550 and provide the image to the communication interface 500.

In addition, the controller 530 may include a processor 600 and a memory 610 by way of an example as shown in FIG. 6. In this case, in response to the first image display apparatus 100 being initially driven, for example, being booted, the processor 600 may call a program stored in the realistic image generator 550 and may load the program into the memory 610. In addition, the processor 600 may execute the program loaded into the memory 610 and generate a realistic image. This operation can process data faster than the operation of receiving an image generated in the realistic image generator 550 described above, and thus is more useful.

In view of this point, it will be understood that the operation of generating the realistic image according to an exemplary embodiment is performed by the controller 530 of FIG. 5 or the processor 600 of FIG. 6, in addition to the realistic image processor 310, 410 as in FIGS. 3 and 4.

In addition, a sound may be output due to the characteristic of the voice call and thus the sound outputter 520 may be included in the first image display apparatus 100. The sound outputter 520 may include a speaker. However, since an external speaker can be connected with the communication interface 500, the speaker may be omitted.

In addition, the realistic image generator 550 may have a form of a program which is stored in a Read Only Memory (ROM). The stored program may be executed under the control of the controller 530 or may be loaded into the memory 610 of the controller 530 at the time of booting as described above as shown in FIG. 6.

This program may be classified into a plurality of modules according to functions as shown in FIG. 7. These modules may be combined with one another and may be configured as a single program. However, an individual module for performing a specific function may be configured by hardware and thus the present disclosure does not limit the module according to whether the module is configured by hardware or software. The "module" in FIG. 7 indicates software and the "unit" indicates a configuration of hardware.

More specifically, the realistic image generator 550 according to an exemplary embodiment may include a part or entirety of a depth information acquisition unit (module) 700, an image analysis unit (module 710, and a composite image generation unit (module) 720.

In the case of a 3D depth camera, the depth information acquisition unit 700 may perform not only an operation of acquiring depth information using stereoscopic, ToF, structured light, etc., but also an operation of separating a user's appearance and a background using the depth information. In addition, a related art 2D camera may be used to separate the user's appearance and the background.

In addition, the image analysis unit 710 may analyze a previous second image which is pre-stored in the storage 560 in the form of 2D, and a currently received second image. To achieve this, the image analysis unit 710 may detect or track the other user's face, location of eyes, etc. as described above.

The composite image generation unit 720 may combine the user's appearance with a virtual background image reflecting depth which is selected according to a change in the locations of the users. By doing so, the first image display apparatus 100 may generate a first image. In the above-described process, the composite image generation unit 720 may change the virtual background image based on the result of analyzing the second image, and regenerate the first image. This has been described above in detail, and thus a detailed description is not provided.

In addition, the communication interface 500, the image sensor 510, the controller 530, the display 540, the realistic image generator 550, and the storage 560 of FIG. 5 are not substantially different from the communication interface 300, the realistic image processor 310, the image sensor 320, the storage 330, and the display 340 of FIG. 3, and thus a detailed explanation thereof is replaced with the above-described explanation.

Figure 8:
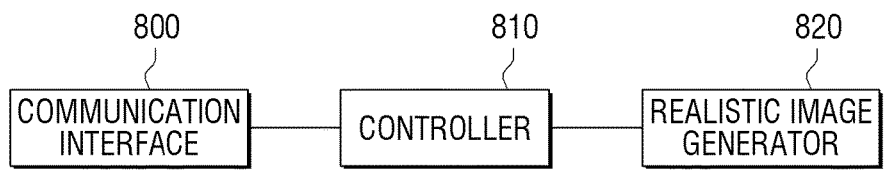
FIG. 8 is a block diagram showing an example of a detailed configuration of a realistic image providing apparatus of FIG. 2.

FIG. 8 is a block diagram showing an example of a detailed configuration of the realistic image providing apparatus of FIG. 2.

As shown in FIG. 8, the realistic image providing apparatus 230 according to an exemplary embodiment may include a part or entirety of a communication interface 800, a controller 810, and a realistic image generator 820.

Herein, the expression "including a part or entirety" may mean that the controller 810 and the realistic image generator 820 are integrated into each other, and, in the following description, the realistic image providing apparatus includes the entirety of the elements for the sake of easy understanding of the present disclosure.

As explained in FIG. 2, the realistic image providing apparatus 230 of FIG. 8 according to an exemplary embodiment differs from the system 90 of FIG. 1 in that the realistic image providing apparatus 230 generates realistic images for both the first image display apparatus 100 and the second image display apparatus 120.

Accordingly, the communication interface 800 and the realistic image generator 820 may get involved in generating the realistic images for both the first image display apparatus 100 and the second image display apparatus 120 of FIG. 2.

In other words, a first image which is generated in the realistic image generator 820 using a photographed image provided by the first image display apparatus 100 is transmitted to the second image display apparatus 120 under the control of the controller 810, and a second image which is generated in the realistic image generator 820 using a photographed image provided by the second image display apparatus 120 is transmitted to the first image display apparatus 100 under the control of the controller 810. To transmit the first and second images, the controller 810 controls the communication interface 800.

Other detailed features have been described in FIGS. 1 and 2 and thus a redundant explanation is omitted.

Figure 9:
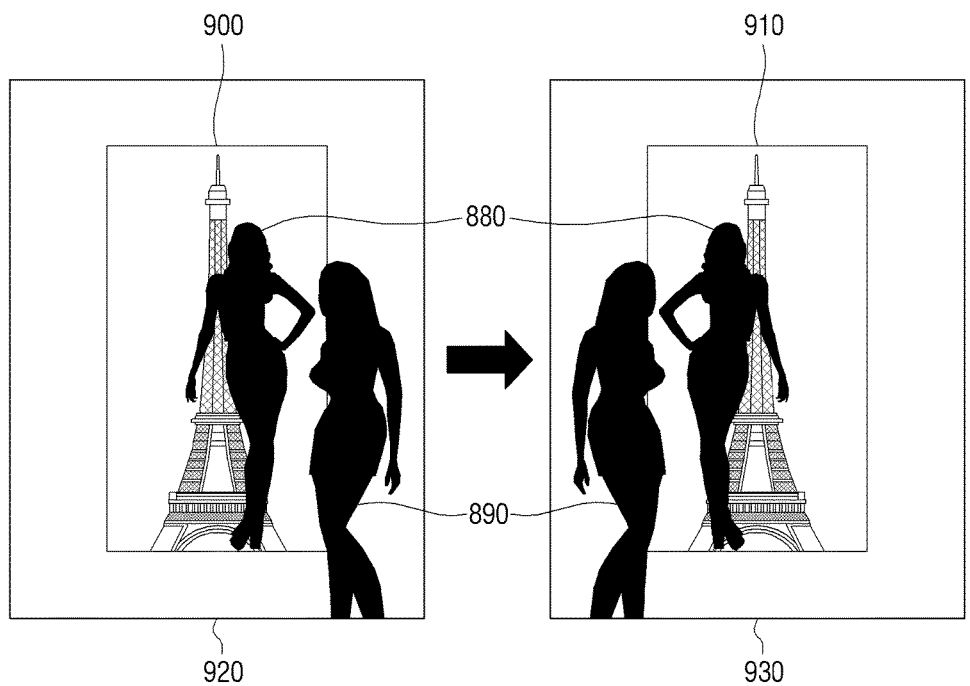
FIG. 9 is a view to illustrate an example of a user location-based parallax effect applied according to an exemplary embodiment.

FIG. 9 is a view to illustrate an example of a user location-based parallax effect applied according to an exemplary embodiment.

Referring to FIG. 9 with FIG. 1, for convenience of explanation, it is assumed that, in a state in which a user 1 890 is viewing a second image 900 in which a certain virtual background image is combined as shown in view 920 of FIG. 9, a location is changed as shown in view 930 of FIG. 9.

In this case, the first image display apparatus 100 may display the second image 910 having the virtual background image changed according to the change of the location of the user 1. In FIG. 9, reference number 880 indicates a user 2.

Figure 10:
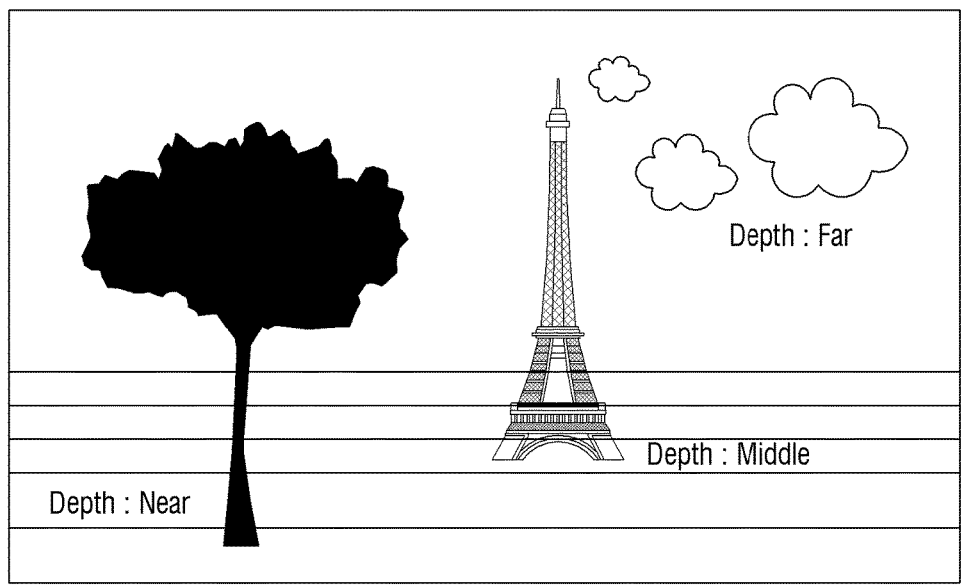
FIG. 10 is a view to illustrate a virtual background including depth information.

FIG. 10 is a view to illustrate a virtual background including depth information.

Referring to FIG. 10 with FIG. 3, the storage 330 of FIG. 3 may generate a virtual background image reflecting depth in order to give perspective, that is, depth, when the location of the user changes as shown in FIG. 10, and pre-store the virtual background image.

For example, in response to the user moving backward from the camera during a video call, a virtual background image at a long distance (Far) as shown in FIG. 10 may be extracted and displayed for the user, and, in response to the user moving toward the camera, a virtual background image at a short distance (Near) as shown in FIG. 10 may be extracted and displayed for the user.

Figure 11:
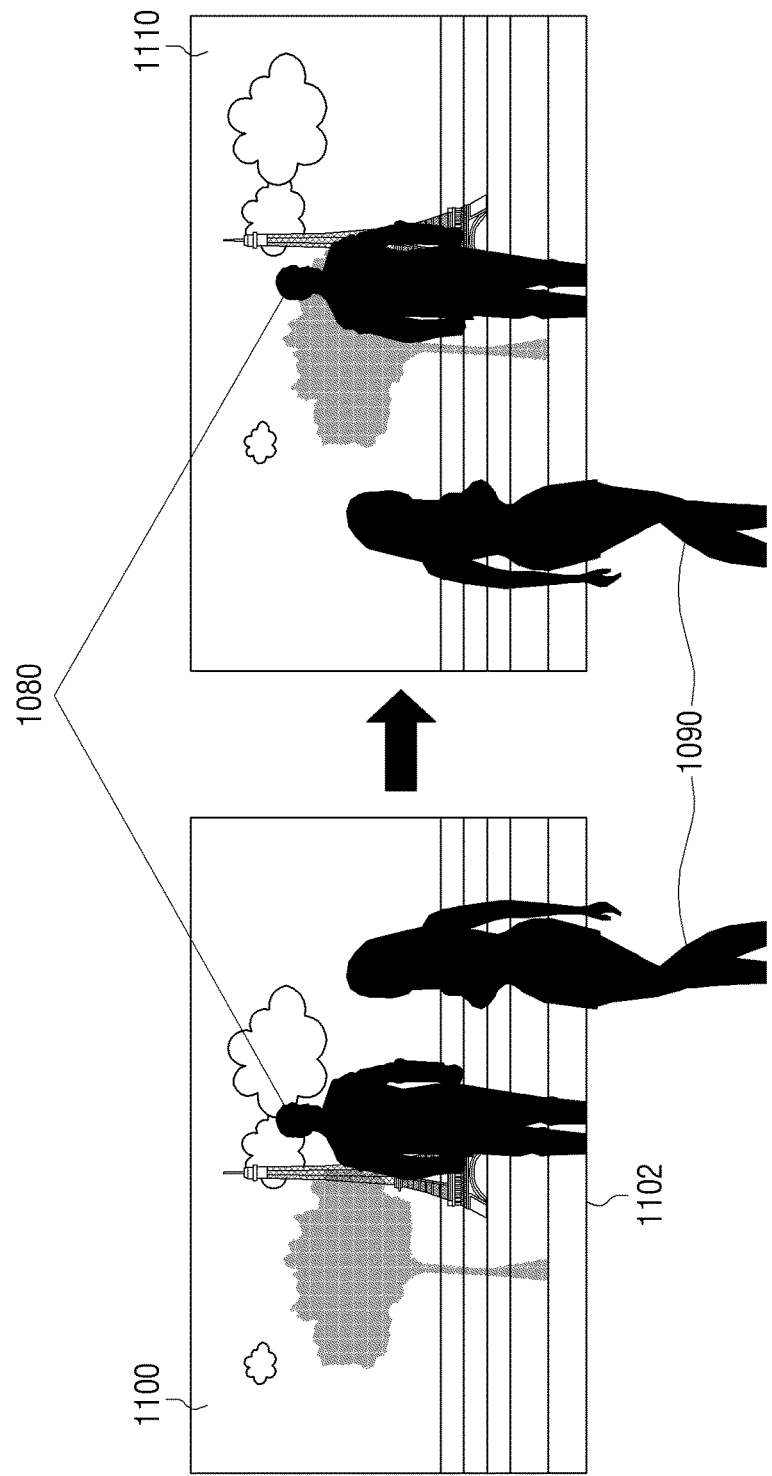
FIG. 11 is a view to illustrate an example of a parallax effect applied according to depth information.

FIG. 11 is a view to illustrate an example of a parallax effect applied according to depth information.

Referring to FIG. 11 with FIG. 1, for convenience of explanation, it is assumed that a user 1 1090 of the first image display apparatus 100 is viewing a second image 1100 in which the appearance of a user 2 1080 and a certain virtual background image are combined as shown in view 1102 of FIG. 11.

In response to the user 1 1090 changing the location from the right to the left and moving backward, the first image display apparatus 100 displays the second image 1110 in which the point of view of the background changes from the right to the left according to the change in the location of the user 1 although the user 2 1080 is fixed. Accordingly, the user 1 views the second image 1110 which has the virtual background image changed in a view 1104 according to the change in his/her location, and thus can enjoy a realistic video call.

Figure 12:
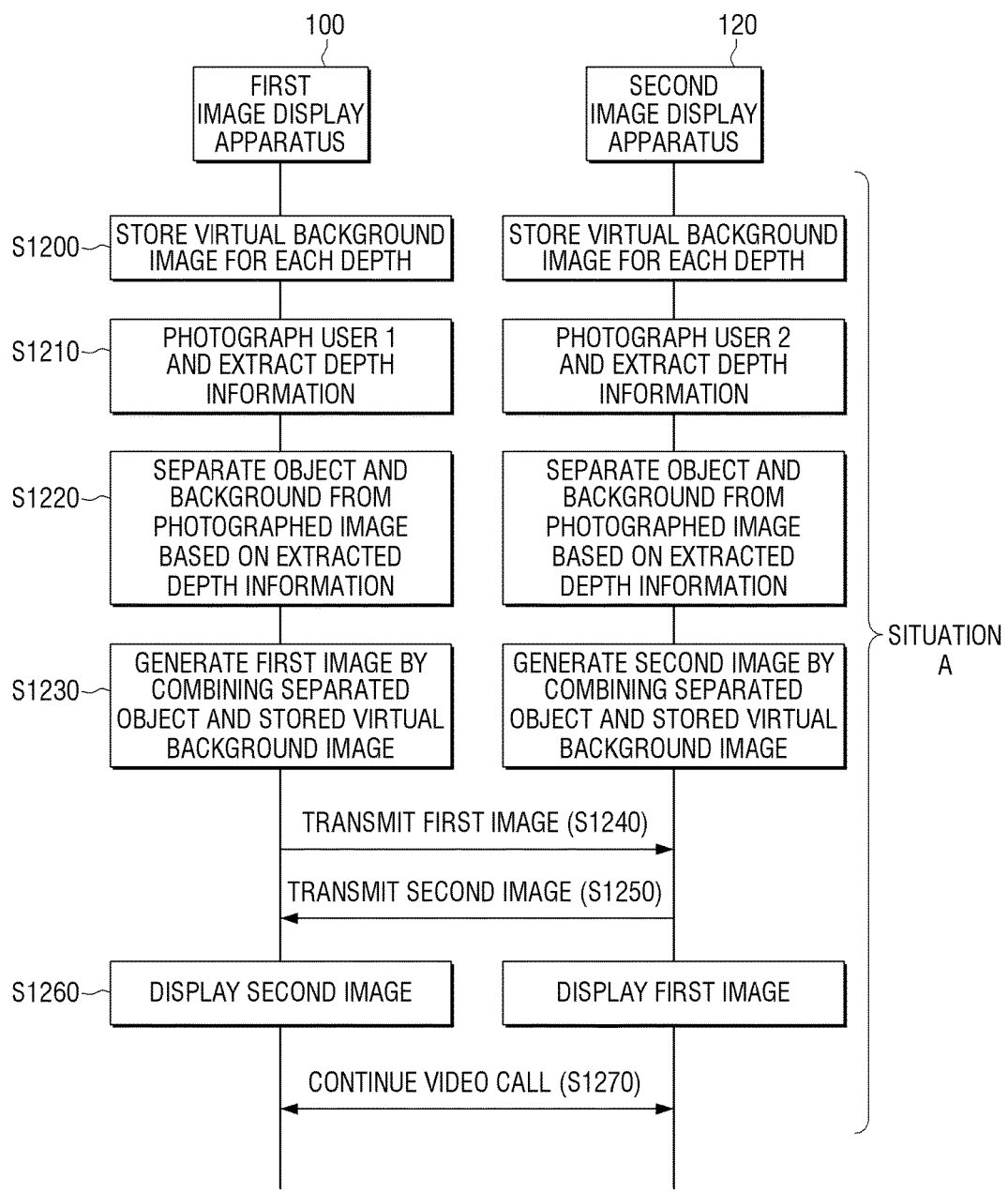
FIGS. 12 and 13 are flowcharts to illustrate a video telephony process according to an exemplary embodiment.
Figure 13:
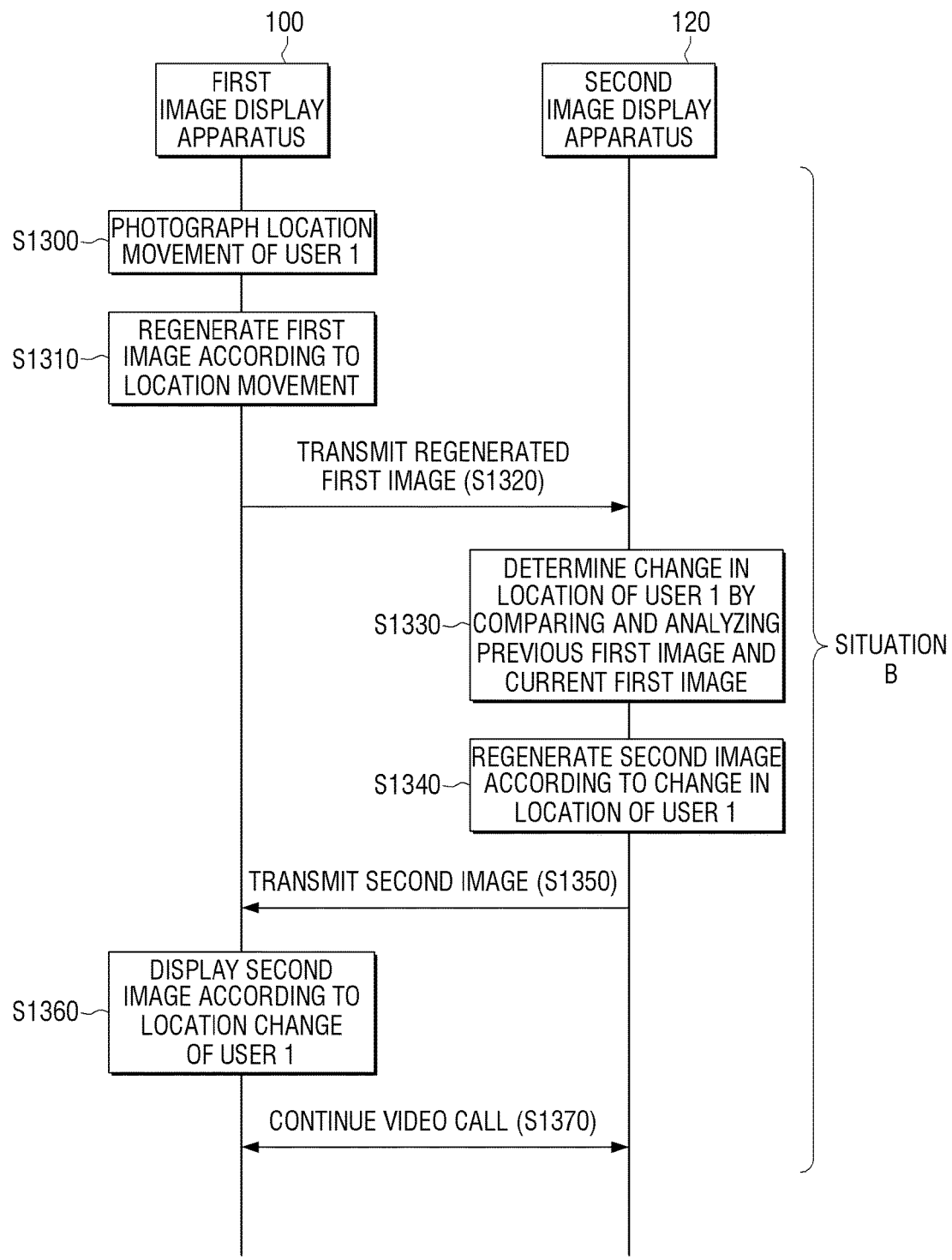

FIGS. 12 and 13 are flowcharts to illustrate a video telephony process according to an exemplary embodiment. FIG. 12 illustrates a process of performing a video call when there is no change in the locations of the user 1 and the user 2 (situation A), and FIG. 13 illustrates a process of performing a video call when there is a change in the location of the user 1 and there is no change in the location of the user 2 (situation B). Regarding these processes, only the first image display apparatus 100 will be explained for convenience of explanation.

Referring to FIG. 12, the first image display apparatus 100 according to an exemplary embodiment stores a virtual background image for each depth (operation S1200).

Next, the first image display apparatus 100 photographs the user 1 when the user 1 performs a video call, and simultaneously, acquires depth information (operation S1210).

In addition, the first image display apparatus 100 separates an object, that is, an image of the user 1, and a background from the photographed image based on the acquired depth information and 2D information (operation S1230).

In addition, the first image display apparatus 100 combines the separated image of the user 1 and a pre-stored certain virtual background image (operation S1230). The virtual background image may be selected by the user at the beginning of the video call, but a virtual background image set as a default may be combined.

Next, the first image display apparatus 100 transmits the generated composite image, that is, a first image, to the second image display apparatus 120, and receives a composite image in which the appearance of the user 2 and a virtual background image are combined in the same method as in operations S1200 to S1230 described above, that is, a second image (operations S1240, S1250).

Accordingly, the first image display apparatus 100 displays the composite image of the user 2 on the screen (operation S1260).

Through the above-described process, the first image display apparatus 100 continues making a video call with the second image display apparatus 120.

In this state, the location of the user 1 may change as shown in FIG. 13.

In this case, the first image display apparatus 100 photographs the user 1 which has his/her location changed (operation S1300).

In addition, the first image display apparatus 100 regenerates the first image according to the location movement and transmits the first image to the second image display apparatus 120 (operations S1310, 1320). Herein, the regenerated first image may be an image in which the appearance of the user 1 is changed or may be the first image in which the virtual background image is changed.

Then, the second image display apparatus 120 may compare and analyze the previously transmitted first image and the currently transmitted first image which has the changed virtual background image, and determine the change in the location of the user 1 (operation S1330). This analysis process may be achieved in the first image display apparatus 100. However, preferably, the first image display apparatus 100 may transmit depth information regarding the degree of change in the location to the second image display apparatus 120, so that the second image display apparatus 120 can select a virtual background image according to the change in the location.

In response to there being the change in the location, the second image display apparatus 120 may extract a virtual background image reflecting the change in the location of the user, and regenerate the second image using the extracted virtual background image (operation S1340). For example, in response to the user 1 being at a distance (d) from the image display apparatus, the distance (d) may be calculated and a virtual background image reflecting the distance (d) may be extracted and used.

In addition, in response to the regenerated second image being transmitted to the first image display apparatus 100, the first image display apparatus 100 displays the regenerated second image on the screen (operation S1360).

Through this process, the user 1 may feel that the second image is changed according to the change in his/her location, and continue making a video call in this process (operation S1370).

Figure 14:
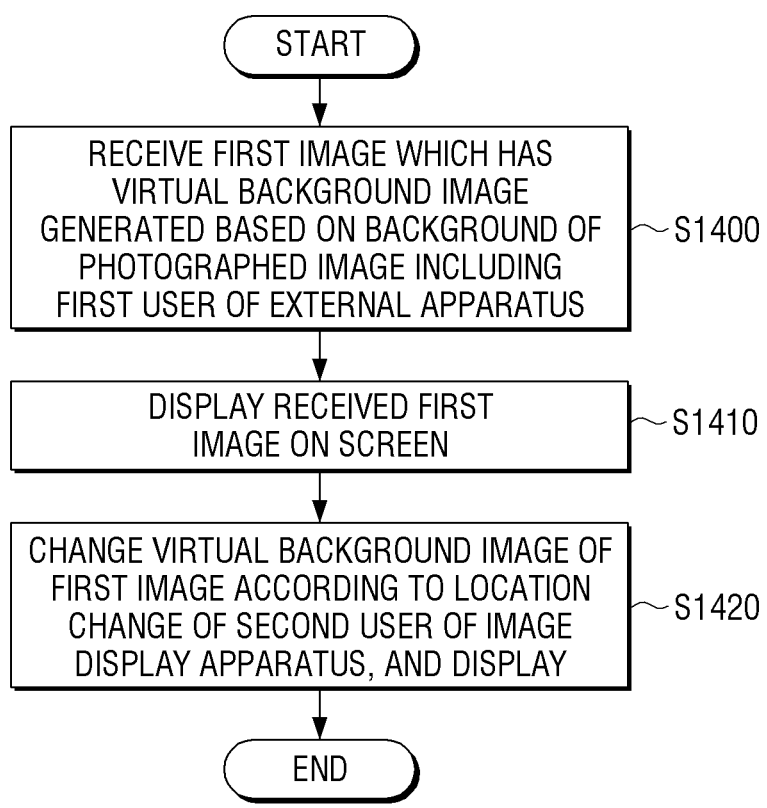
FIG. 14 is a flowchart showing a driving process of an image display apparatus according to an exemplary embodiment.

FIG. 14 is a flowchart showing a driving process of the image display apparatus according to an exemplary embodiment.

Referring to FIG. 14 with FIG. 1 for convenience of explanation, the second image display apparatus 120 according to an exemplary embodiment receives a first image which has a virtual background image generated based on the background of the photographed image of the user 1 of an external apparatus, for example, the first image display apparatus 100 (operation S1400).

Next, the second image display apparatus 120 displays the received first image on the screen (operation S1410).

In addition, the virtual background image of the first image is changed according to a change in the location of the user 2 of the second image display apparatus 120, and the first image is displayed (operation S1420).

Other operations have been described above and thus a detailed explanation thereof is replaced with the above-described explanation.

FIG. 15 is a flowchart showing a driving process of the image display apparatus according to another exemplary embodiment.

Referring to FIG. 15 with FIG. 1 for convenience of explanation, the user 1 of the first image display apparatus 100 may start with selection of a 3D virtual background at the beginning of a video call (operation S1500). The 3D virtual background may be selected by default.

In addition, in response to an image, that is, a second image, being received (operation S1510), the first image display apparatus 100 may store the received image and then analyze whether there is a change in the location of the other user, that is, the user 2 (operation S1520).

In response to there being a change in the location (operation S1530), the first image display apparatus 100 extracts a 3D virtual background corresponding to the change in the location of the other user (operation S1540).

In addition, the first image display apparatus 100 acquires a photographed image, separates a real background and the user, and combines the separated user and the extracted 3D virtual background (operations S1550, 1560).

In addition, the first image display apparatus 100 transmits the combined image data to the second image display apparatus 120 (operation S1580).

Thereafter, the first image display apparatus 100 determines whether there is a request for end of the video call and finishes the video call (operation S1580).

FIG. 16 is a flowchart showing a realistic image generation process of the image display apparatus according to an exemplary embodiment.

Referring to FIG. 16 with FIGS. 1 and 3 for convenience of explanation, the first image display apparatus 100 according to an exemplary embodiment generates a first image by substituting a background of a photographed image of the user 1 of the first image display apparatus 100 with a virtual background image to transmit the image to an external apparatus, that is, the second image display apparatus 120 (operation S1600).

Next, in response to there being a change in the location of the user 2 of the second image display apparatus 120, the first image display apparatus 100 regenerates the first image by changing the virtual background image according to the change in the location (operation S1610). Herein, the change in the location may be determined by the first image display apparatus 100 analyzing a second image received from the second image display apparatus 120. Accordingly, the first image display apparatus 100 may select (or extract) a virtual background image based on the determined amount of change in the location.

In addition, the first image display apparatus 100 provides the regenerated first image to the external apparatus, that is, the second image display apparatus 120 (operation S1620).

FIG. 16 illustrates a situation in which, when a user who is making a video call while seeing the image of the other user changes his/her location, a virtual background image in the image of the other user is changed, from among the above-described two situations in which the virtual background image is changed.

Although it is explained that all of the elements of exemplary embodiments are combined into a single element or are operated in combination, the present disclosure is not limited to these exemplary embodiments. That is, one or more elements may be selectively combined and operated without departing from the scope of the present disclosure. In addition, all of the elements may be implemented by using a single piece of independent hardware, but some or all of the elements may be selectively combined and may be implemented as a computer program which has a program module for performing some or all of the functions combined in a single piece or a plurality of pieces of hardware. Codes and code segments constituting the computer program may be easily inferred by a person skilled in the art. This computer program may be stored in a non-transitory compute readable medium and may be read and executed by the computer, thereby implementing the exemplary embodiments.

The non-transitory computer readable medium refers to a medium that stores data semi-permanently rather than storing data for a very short time, such as a register, a cache, a memory or etc., and is readable by an apparatus. Specifically, the above-described various programs may be stored in the non-transitory computer readable medium such as a compact disc (CD), a digital versatile disk (DVD), a hard disk, a Blu-ray disk, a universal serial bus (USB), a memory card, a ROM, etc.

Although a few exemplary embodiments have been shown and described, exemplary embodiments are not limited thereto. It would be appreciated by those skilled in the art that changes may be made in these exemplary embodiments without departing from the principles and spirit of the disclosure, the scope of which is defined in the claims and their equivalents.

What is claimed is:

1. An image display apparatus which performs a video call with an external apparatus, the image display apparatus comprising:
   a communication interface configured to receive a first image, which is generated by photographing a first user of the external apparatus, and to transmit, to the external apparatus, a second image in which a background of a photographed image of a second user of the image display apparatus is substituted with a first virtual background image in response to a user command to perform the video call;
   a display configured to display the received first image; and
   a controller configured to determine whether a location of the first user is changed in the first image received from the external apparatus and to change the first virtual background image of the second image with a second virtual background image according to determining the change in the location of the first user, the second virtual background image being a virtual image different from the first virtual background image.

2. The image display apparatus of claim 1, further comprising a storage configured to store a plurality of virtual background images including the first virtual background image and the second virtual background image,
   wherein the controller is configured to transmit, to the external apparatus, the second image which is generated by substituting the background of the photographed image of the second user with the stored first virtual background image, in response to the user command to perform the video call.

3. The image display apparatus of claim 2, wherein the storage is configured to classify the plurality of virtual background images by depth, and store the classified plurality of virtual background images, and
   the controller is configured to select a virtual background image of the depth corresponding to the change in the location of the first user, among the plurality of virtual background images, as the second virtual background image, generate the second image based on the second virtual background image, and transmit the second image to the external apparatus.

4. The image display apparatus of claim 1, wherein the controller is configured to analyze the first image received from the external apparatus and determine whether the location of the first user is changed, change the first virtual background image of the second image in response to determining the change in the location of the first user, and transmit the second image to the external apparatus, to display the second image, which has the changed virtual background image, on the external apparatus.

5. The image display apparatus of claim 1, further comprising an image sensor configured to photograph the second user,
wherein the controller is configured to separate an image of the second user from the photographed image, and combine the separated image of the second user with the first virtual background image, in response to the user command to perform the video call, or with the second virtual background image, in response to the change in the location of the first user.

6. The image display apparatus of claim 1, further comprising a user interface configured to receive the user command to make the video call,
wherein the controller is configured to generate the second image which has the background substituted with the first virtual background image, and transmit the second image to the external apparatus, in response to the user command being received via the user interface.

7. A driving method of an image display apparatus which performs a video call with an external apparatus, the driving method comprising:
receiving a first image which is generated by photographing a first user of the external apparatus;
displaying the received first image on a screen of the image display apparatus;
transmitting, to the external apparatus, a second image in which a background of a photographed image of a second user of the image display apparatus is substituted with a first virtual background image;
determining whether a location of the first user is changed in the first image received from the external apparatus; and
changing the first virtual background image of the second image to a second virtual background image according to a change in the location of the first user, and transmitting the changed second image to the external apparatus, the second virtual background image being a virtual image different from the first virtual background image.

8. The driving method of claim 7, further comprising:
storing a plurality of virtual background images including the first virtual background image and the second virtual background image;
generating the second image by substituting the background of the photographed image of the second user with the stored first virtual background image in response to a user command to perform the video call or with the stored second virtual background image in response to the change in the location of the first user; and
transmitting the generated second image to the external apparatus.

9. The driving method of claim 8, wherein the storing comprises:
classifying the plurality of virtual background images by a depth; and
storing the classified plurality of virtual background images,
wherein the generating the second image comprises selecting a virtual background image of the depth corresponding to the change in the location of the first user, among the plurality of virtual background images, as the second virtual background image, and generating the second image to include the second virtual background image.

10. The driving method of claim 7, wherein the changing comprises:

analyzing the first image received from the external apparatus;
determining whether the location of the first user is changed; and
generating the second image by replacing the first virtual background image of the second image with the second virtual background image, in response to the determining the change in the location of the first user, to display the second image which has the changed virtual background image on the external apparatus.

11. The driving method of claim 7, further comprising:
photographing the second user;
separating an image of the second user from the photographed image; and
generating the second image by combining the separated image of the second user with the first virtual background image, in response to a user command to perform the video call, or with the second virtual background image, in response to the change in the location of the first user.

12. The driving method of claim 7, further comprising receiving a user command to make the video call,
wherein the transmitting the second image comprises generating the second image which has the background substituted with the first virtual background image, in response to the user command being received.

13. A method for generating a realistic image in an image display apparatus, the method comprising:
generating a first image by substituting a background of a photographed image of a first user of the image display apparatus with a first virtual background image, to be transmitted to an external apparatus;
determining whether a location of a second user is changed by analyzing a second image of the second user received from the external apparatus;
regenerating the first image by changing the first virtual background image to a second virtual background image, in response to the determining a change in the location of the second user, the second virtual background image being different from the first virtual background image; and
providing the regenerated first image to the external apparatus.

14. The method of claim 13, wherein the determining comprises:
receiving, from the external apparatus, the second image which is generated by substituting a background of a photographed image of the second user with a third virtual background image;
receiving, from the external apparatus, the second image which has the third virtual background image changed to a fourth virtual background image according to the change in the location of the first user, the fourth virtual background image being different from the third virtual background image; and
providing the received second image to a display of the image display apparatus.

15. The method of claim 14,
wherein the regenerating comprises regenerating the first image by selecting a virtual background image corresponding to the change in the location of the second user, among virtual background images which have been pre-stored, as the second virtual background image, in response to the determining the change in the location of the second user.

16. The method of claim 13, further comprising:
in response to the first user being photographed, acquiring depth information on objects included in the photographed image;
separating an image of the first user from the photographed image using the acquired depth information; and
combining the separated image of the first user and the first virtual background image, in response to a user command to perform a video call.

* * * * *